Aug. 10, 1965
H. N. IPSEN
3,199,854
HEAT TREATING FURNACE
Filed Aug. 10, 1962
3 Sheets-Sheet 1
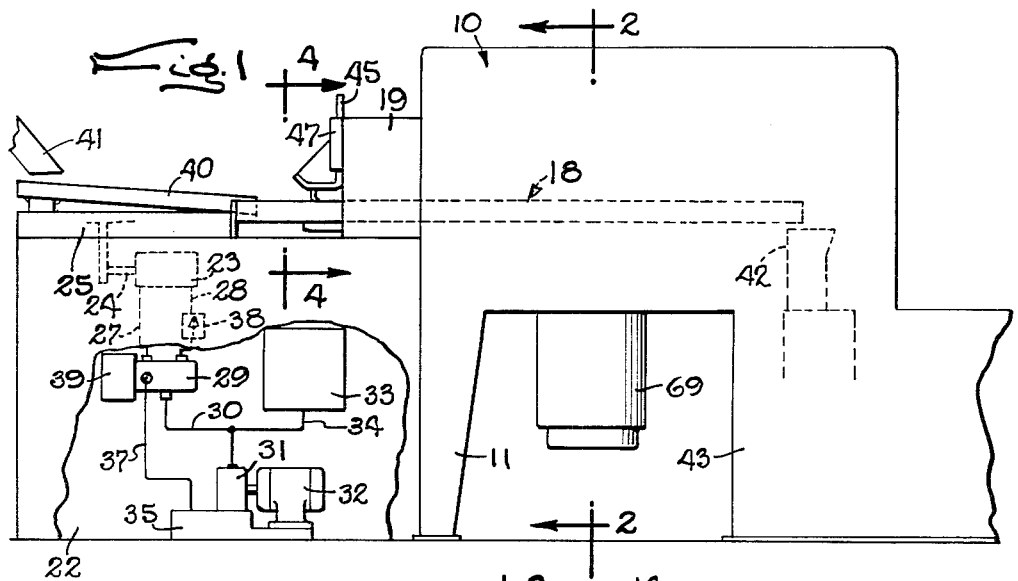
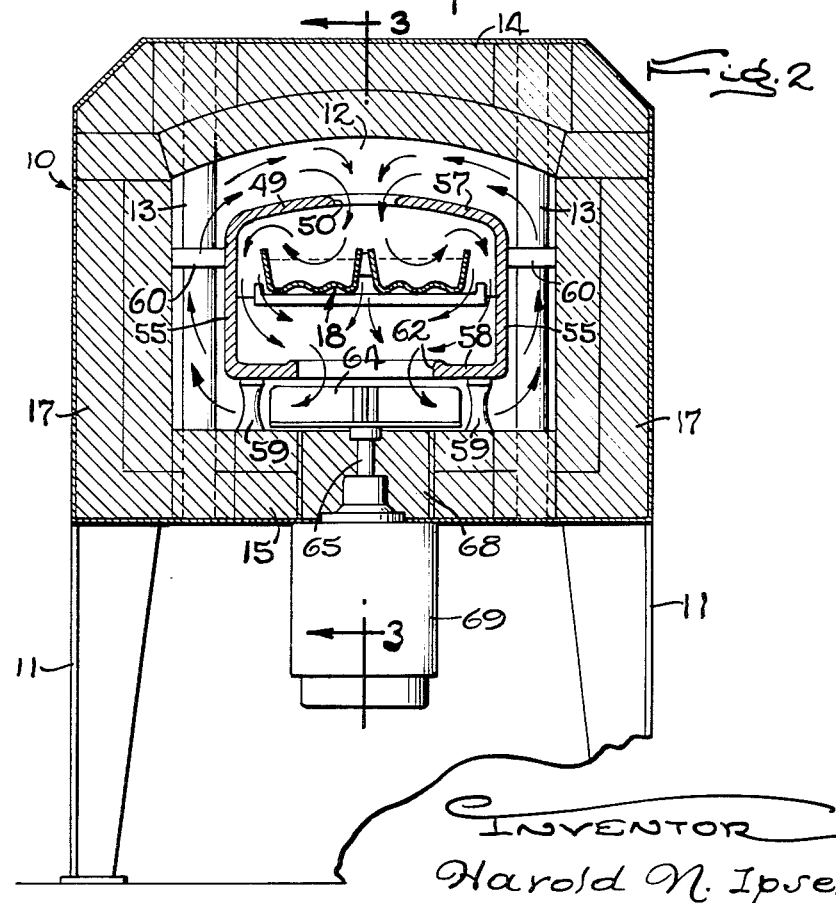
INVENTOR
Harold N. Ipsen
by Wolfe, Hubbard, Voit & Osann
ATTORNEYS

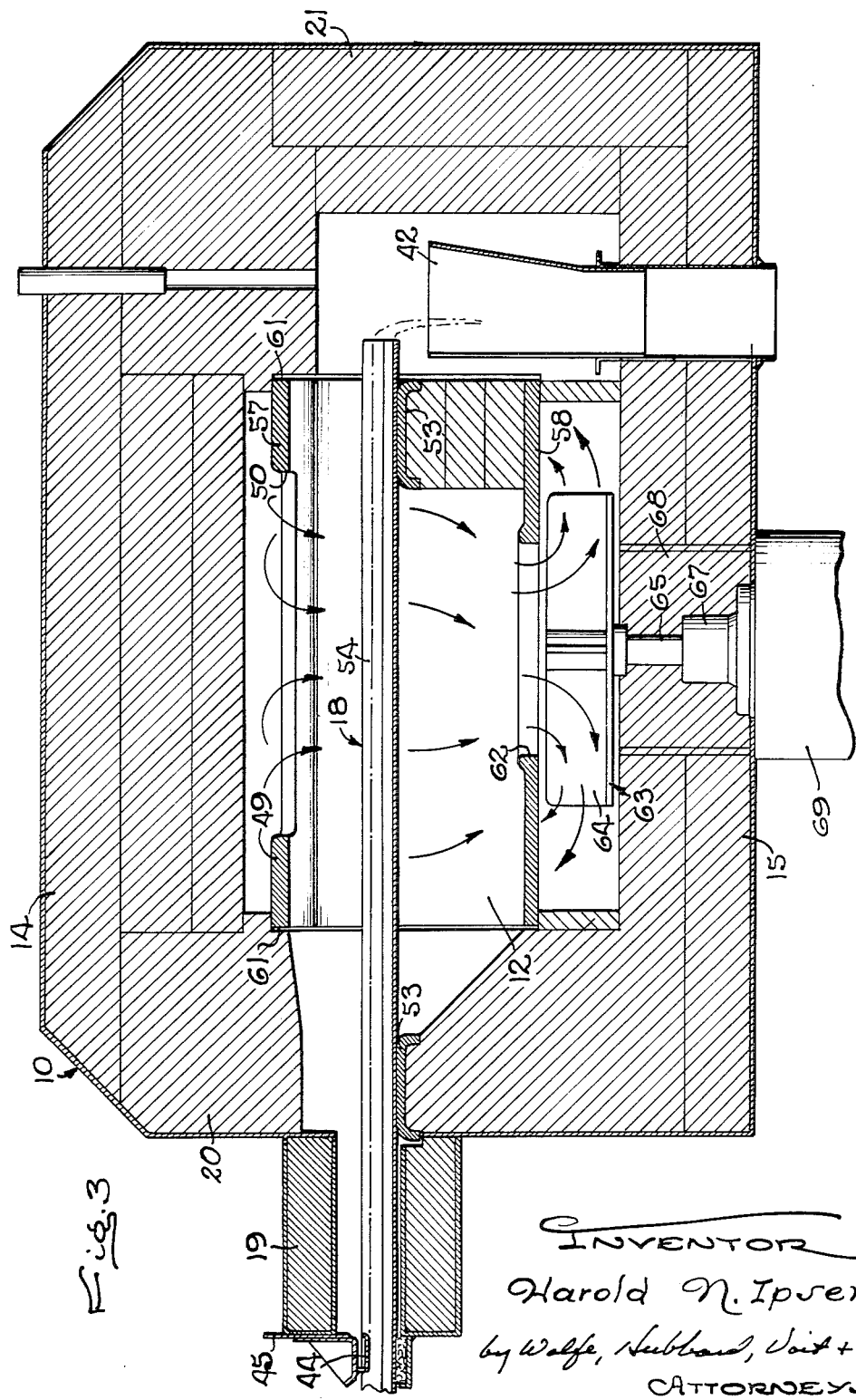

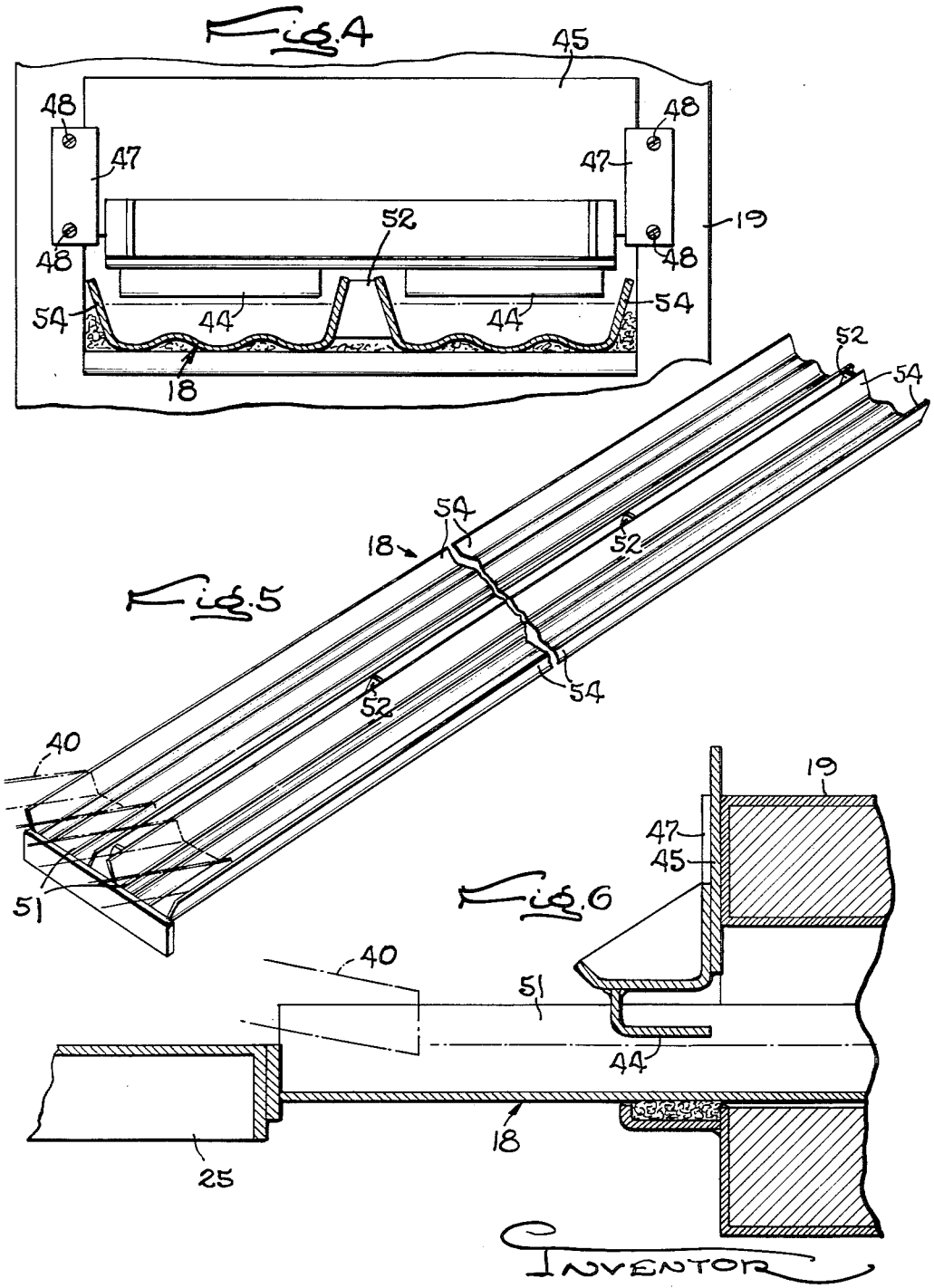

3,199,854
HEAT TREATING FURNACE
Harold N. Ipsen, % Ipsen Industries Inc., P.O. Box 500,
Rockford, Ill.; The Illinois National Bank & Trust Co.,
executor of the will of said Harold N. Ipsen, deceased
Filed Aug. 10, 1962, Ser. No. 216,152
3 Claims. (Cl. 266—5)

This invention relates to a furnace for heat treating metal workpieces and, more particularly, to a furnace of the so-called shaker hearth type in which parts to be treated are arranged in a layer on the furnace hearth and the hearth is agitated endwise back and forth whereby the inertia of the parts advances them step by step through the furnace.

The general object of the present invention is to provide a novel furnace of the above character in which workpieces are heated faster and more uniformly than has been possible with prior art shaker hearth furnaces.

A more specific object is to protect the workpieces in the furnace in a radiation shielding baffle and direct a concentrated flow of heated gas downwardly into the layer of parts at a velocity high enough to insure effective penetration of the gas into and through the layer of parts and circulation of the gas throughout the layer.

Another object is to utilize two side-by-side imperforate trays to form the hearth and to space the adjacent edges of the trays apart whereby the flow of gas from the jet above the trays also passes between the trays to heat the intermediate portion of the hearth and prevent the occurrence of cold spots therein.

Other objects and advantages of the invention will become apparent from the following detailed description taken in connection with the accompanying drawings, in which FIGURE 1 is a fragmentary side elevational view of a heat treating furnace embodying the novel features of the present invention, with parts broken away and shown in section.

FIG. 2 is an enlarged fragmentary sectional view taken along the line 2—2 of FIG. 1.

FIG. 3 is an enlarged fragmentary sectional view taken along the line 3—3 of FIG. 2.

FIG. 4 is an enlarged fragmentary sectional view taken along the line 4—4 of FIG. 1.

FIG. 5 is an enlarged fragmentary perspective view of the furnace hearth.

FIG. 6 is an enlarged fragmentary sectional view similar to a portion of FIG. 3.

As shown in the drawings for purposes of illustration, the invention is embodied in a furnace for heat treating metal workpieces. The furnace is formed by a walled enclosure 10 supported above floor level on legs 11 and lined with suitable insulation such as fire brick defining a heating chamber 12. The latter is heated by two series of vertical heating tubes 13 spanning the top and bottom walls 14 and 15 of the chamber adjacent the side walls 17 thereof.

Workpieces are loaded into the furnace and onto the furnace hearth 18 through an insulated throat 19 opening through the front wall 20 of the chamber 12 and forming a preheating vestibule. In this instance, the furnace is of the so-called shaker hearth type in which the hearth is agitated endwise back and forth to advance the workpieces through the furnace, the hearth moving first relatively slowly in one direction to carry the workpieces a predetermined distance toward the rear wall 21 of the chamber, and then rapidly back so that the inertia of the workpieces slides them step by step along the hearth and through the furnace.

This agitation of the hearth is produced by a shaker mechanism housed in a cabinet 22 (FIG. 1) outside the furnace and including, in this instance, a reciprocating hydraulic motor comprising a cylinder 23 and a piston (not shown) guided in the cylinder for back and forth movement along a path paralleling the path of the work through the furnace. The piston rod 24 is fast on a slide 25 movable back and forth on the cabinet and rigid with the adjacent end of the hearth 18 which projects out of the furnace through the vestibule. The opposite ends of the cylinder communicate through lines 27 and 28 with a four-way valve 29 in the output line 30 of a suitable pump 31 driven by an electric motor 32. An accumulator 33 communicating through a branch line 34 with the pump output line 30 insures the availability of a ready supply of pressure fluid.

Through the valve 29, pressure fluid is delivered alternately to the lines 27 and 28 and thus to the opposite ends of the cylinder 23 to shift the piston back and forth. While fluid flows to the left-hand or rod end of the cylinder, the piston moves to the right as viewed in FIG. 1 and advances the hearth 18 and the workpieces thereon into the furnace. During this forward stroke of the piston, fluid drains from the head end of the cylinder into the sump 35 through the line 28 and a drain line 37 from the valve. A one-way flow control valve 38 restricts the rate of draining through the line 28 and thus regulates the rate of advance of the hearth.

Conversely, as fluid is delivered through the line 28 to the head end of the cylinder 23, the piston shifts the hearth 18 to the left. Since there is free flow through the valve 38 in this direction and there is no restriction to draining from the rod end of the cylinder, the reverse stroke is sudden and rapid with the result that the inertia of the parts overcomes the frictional force holding them in place on the hearth. Accordingly, the parts slide along the hearth a distance approximately equal to the stroke of the hearth. The operation of the four-way valve 29 is controlled by a solenoid 39 which may be timed to produce any desired length of stroke such as one-half or three-quarters of an inch.

Herein, workpieces are delivered continuously to the forward end of the hearth by a feeder including a downwardly inclined trough 40 overlapping the projecting end of the hearth and receiving workpieces adjacent its upper end from a hopper-fed chute 41. The feeder trough is supported on the slide and reciprocates therewith to slide workpieces onto the hearth. After passing through the heating chamber, the workpieces are discharged into a chute 42 (FIG. 1) leading to a quench tank 43 below the rear end of the hearth.

In furnaces of this type, the work, which may comprise a large bulk of relatively small parts, is fed continuously into and through the furnace with a minimum of handling and attention by an operator. To distribute the parts in an even layer over the hearth, horizontal leveling plates 44 are mounted on a vertically adjustable door 45 partially closing the opening into the vestibule, the leveling plates engaging the top of the layer of parts on the hearth and spreading the parts over the hearth. The door is positioned over the vestibule opening by plates 47 (FIG. 4) clamped releasably against the door by screws 48. Thus, by raising and lowering the door, the depth of the layer of parts on the hearth may be controlled. Moreover, the door and the leveling plates substantially close the vestibule opening and reduce the amount of heat escaping therefrom.

In accordance with the present invention, the furnace is constructed in a novel manner to obtain faster and more uniform heating than has been possible with prior shaker hearth furnaces. For these purposes, the workpieces on the hearth 18 are protected from direct radiation from the heating tubes 13 by a baffle 49 and pass under a jet 50 which directs a concentrated high-velocity flow of heated atmosphere into the layer of workpieces on the hearth thereby insuring effective penetration of the flow into the spaces between the workpieces and thorough circulation of the atmosphere within the layer. Accordingly, the work is heated almost entirely by convection, even when arranged in a layer of substantial depth, and each part is heated rapidly and uniformly by the flow of the atmosphere within the layer.

Herein, the hearth 18 comprises a pair of elongated imperforate trays 51 disposed side by side and projecting through the front and rear walls 20 and 21 of the furnace chamber 12 as shown most clearly in FIG. 3, the edges of the trays being joined together by plates 52 (FIGS. 4 and 5) spaced apart along the length of the trays and spacing the edges of the trays apart. Beneath the trays at each end of the chamber is a slide plate 53 (FIG. 3) which bears against the undersides of the trays and supports them above the lower wall 15 of the chamber and for endwise sliding back and forth in the chamber. The longitudinal edge portions 54 of the trays are turned upwardly to hold the parts against sliding off the sides of the trays.

To strengthen the trays, the latter preferably are longitudinally corrugated as shown in FIGS. 2, 4 and 5. The resulting cross-sectional contour of the trays also maintains uniform frictional engagement with the work.

The baffle 49 is composed of suitable radiation shielding material such as silicon carbide and comprises two upright walls 55 (FIG. 2) on opposite sides of the hearth joined together above and below the hearth by an arch 57 and a bottom wall 58. To support the baffle securely in the chamber 12 in spaced relation with the top, bottom, and side walls thereof, piers 59 (FIG. 2) projecting upwardly from the lower wall 15 engage the underside of the baffle, and skew piers 60 projecting inwardly from the chamber side walls 17 engage the side walls of the baffle. The front and rear edges 61 (FIG. 3) of the baffle walls are recessed into the front and rear walls of the chamber.

Formed in the arch 57 above the hearth 18 is the opening forming the jet 50 which preferably is centered between the outer side edges 54 of the trays 51 and is elongated in the direction of the length of the trays. The width of the jet opening is substantially less than the combined width of the two trays. Directly below the trays in the lower baffle wall 58 is a rectangular outlet opening 62 which herein is centered in the lower wall to lie directly below the jet opening.

Means is provided for circulating the atmosphere in the furnace chamber 12 to heat the atmosphere and obtain a forced flow downwardly through the jet 50 into the baffle 49. Herein, this means takes the form of a centrifugal fan 63 mounted in the chamber below the outlet port 62 and including a plurality of angularly spaced blades 64 projecting radially from the upper projecting end of a vertical shaft 65 journaled in bearings 67 in a plug 68 fast in the bottom wall 15 of the furnace. The fan shaft is driven by a motor 69 suspended beneath the furnace.

As shown in FIGS. 2 and 3, the upper edges of the blades 64 move in a plane closely adjacent the underside of the baffle and force the gas below the baffle outwardly away from the outlet port and upwardly along both sides of the baffle thereby drawing gas from the baffle and circulating it around the heating tubes 13. The heated gas then is forced over the top of the baffle from both sides and enters the baffle through the narrow jet opening 50 as indicated by the arrows in FIGS. 2 and 3.

Thus, the flow of gas from both sides of the baffle is concentrated into one narrow opening disposed above the trays with the result that the heated gas is directed into the trays at high velocity and, therefore, penetrates deeply into the layer of parts in each tray to be dispersed through the layer and heat all the parts rapidly and uniformly. A portion of the flow passes between the trays and heats the inner side portions 54 thereof to insure against the presence of cold spots in the trays themselves. The gas flows into, around, and between the trays and then downwardly into the outlet port to be recirculated by the fan. With the jet elongated longitudinally of the trays, parts remain in this concentrated flow of heated gas for a period of time sufficient to insure that they are heated to the desired temperature.

Furnaces constructed in accordance with the present invention are especially well suited for use in hardening, carbonitriding, and case carburizing metal workpieces and are capable of high capacity operation at low operating cost. Most importantly, rapid and uniform heating of a large volume of work is achieved by advancing the work along an imperforate hearth and directing a concentrated, high-velocity flow of heated gas into the layers of workpieces on the hearth to insure penetration of the gas into the layer and circulation of the gas around all the parts therein.

I claim as my invention:

1. In a heat treating furnace, the combination of, a walled structure defining a heating chamber, an elongated endwise reciprocable hearth comprising two elongated side-by-side trays extending generally horizontally through said chamber to support two successions of workpieces to be treated, the adjacent sides of said trays being spaced apart, means for shaking said hearth endwise back and forth and advancing said workpieces step by step through said chamber, a baffle in said chamber having a top, a bottom and sides disposed respectively above, below and on opposite sides of said hearth, said baffle having an outlet opening therein beneath said hearth and an inlet opening disposed above said hearth elongated longitudinally of the hearth and generally centered on the space between said trays in position to direct a jet of air downwardly through said space and onto the workpieces moving along the hearth, a plurality of heating elements in said chamber arranged around said baffle to heat the atmosphere outside the baffle, and a centrifugal fan disposed below said outlet opening and operable when rotated at high speed to draw atmosphere out of said baffle, circulate said atmosphere upwardly past said heating elements, then downwardly at high velocity through said inlet opening and onto said hearth to heat the workpieces thereon, and out through said outlet opening for recirculation past said heating elements.

2. In a heat treating furnace, the combination of, a walled structure defining a heating chamber, an endwise reciprocable hearth comprising two elongated side-by-side trays extending generally horizontally through said chamber to support two successions of workpieces to be treated, the adjacent sides of said trays being spaced apart, means for shaking said hearth endwise back and forth and advancing said workpieces step by step through said chamber, at least one heating element for heating the atmosphere in said chamber, a baffle in said chamber having a top, a bottom and sides disposed respectively above, below and on opposite sides of said hearth to protect workpieces from direct heating by said element, said baffle having an outlet opening therein beneath said hearth and an inlet opening disposed above said hearth and generally centered on the space between said trays in position to direct a jet of air downwardly through said space and onto the workpieces moving along the hearth, and means for circulating said atmosphere along a predetermined path past said heating element, downwardly at high velocity through said inlet opening and onto said hearth to heat the workpieces thereon, out through said outlet opening and back past said heating element.

3. In a heat treating furnace, the combination of, a walled structure defining a heating chamber, an elongated endwise reciprocable hearth extending generally horizontally through said chamber to support a succession of workpieces to be treated, means for shaking said hearth endwise back and forth and advancing said workpieces step by step through said chamber, at least one heating element for heating the atmosphere in said chamber, a baffle in said chamber having a top, a bottom and sides disposed respectively above, below and on opposite sides of said hearth to protect workpieces from direct heating by said element, said baffle having an outlet opening therein beneath said hearth and an inlet opening disposed above said hearth in position to direct a jet of air downwardly onto the workpieces moving along the hearth, and means for circulating said atmosphere along a predetermined path past said heating element, downwardly at high velocity through said inlet opening and onto said hearth to heat the workpieces thereon, out through said outlet opening and back past said heating element.

References Cited by the Examiner

UNITED STATES PATENTS

| | | | |
|---|---|---|---|
| 2,021,072 | 11/35 | Machlet | 266—5 |
| 2,815,305 | 12/57 | Ipsen | 266—5 X |

MORRIS O. WOLK, *Primary Examiner.*

JAMES H. TAYMAN, *Examiner.*